US012042440B1

(12) United States Patent
Wilson et al.

(10) Patent No.: US 12,042,440 B1

(45) Date of Patent: Jul. 23, 2024

(54) STOWABLE PATIENT SUPPORTS

(71) Applicant: Turn Medical, LLC, San Antonio, TX (US)

(72) Inventors: Kevin S. Wilson, San Antonio, TX (US); Eric W. Barta, Castle Hills, TX (US); Christopher T. Niederkrom, San Antonio, TX (US)

(73) Assignee: Turn Medical, LLC, San Antonio, TX (US)

( * ) Notice: Subject to any disclaimer, the term of this patent is extended or adjusted under 35 U.S.C. 154(b) by 269 days.

(21) Appl. No.: 17/723,249

(22) Filed: Apr. 18, 2022

Related U.S. Application Data

(60) Provisional application No. 63/176,145, filed on Apr. 16, 2021.

(51) Int. Cl.
*A61G 13/00* (2006.01)
*A61G 13/12* (2006.01)

(52) U.S. Cl.
CPC ................................ *A61G 13/1295* (2013.01)

(58) Field of Classification Search
CPC ........ A61G 13/00; A61G 13/10; A61G 13/12; A61G 13/128; A61G 13/1295
See application file for complete search history.

(56) References Cited

U.S. PATENT DOCUMENTS

| | | | |
|---|---|---|---|
| 3,681,797 A | 8/1972 | Messner | |
| 4,391,009 A | 7/1983 | Schild | |
| 4,729,598 A | 3/1988 | Hess | |
| 4,947,496 A | 8/1990 | Connolly | |
| 5,249,320 A | 10/1993 | Moretz | |
| 5,412,821 A | 5/1995 | Wilkinson | |
| 5,487,196 A | 1/1996 | Wilkinson | |
| 5,794,288 A | 8/1998 | Soltani | |
| 5,870,785 A | 2/1999 | Hoorens | |
| 5,882,349 A | 3/1999 | Wilkerson | |
| 5,926,884 A | 7/1999 | Biggie | |
| 6,065,165 A | 5/2000 | Delk | |
| 6,108,838 A | 8/2000 | Connolly | |
| 6,112,349 A | 9/2000 | Connolly | |
| 6,212,718 B1 | 4/2001 | Stolpmann | |
| 6,282,736 B1 | 9/2001 | Hand | |
| 6,367,106 B1 | 4/2002 | Gronsman | |
| 6,499,160 B2 | 12/2002 | Hand | |
| 6,526,610 B1 * | 3/2003 | Hand | A61G 7/052 5/503.1 |
| 6,566,833 B2 | 5/2003 | Bartlett | |
| 6,609,260 B2 | 8/2003 | Hand | |
| 6,619,382 B1 | 9/2003 | Ichigaya | |
| 6,671,905 B2 | 1/2004 | Bartlett | |
| 6,691,347 B2 | 2/2004 | Hand | |
| 6,701,553 B1 | 3/2004 | Hand | |
| 6,701,556 B2 | 3/2004 | Romano | |
| 6,715,169 B2 | 4/2004 | Niederkrom | |
| 6,728,983 B2 | 5/2004 | Bartlett | |

(Continued)

FOREIGN PATENT DOCUMENTS

| | | |
|---|---|---|
| DE | 202005007453 U1 | 10/2005 |
| EP | 0315438 | 5/1989 |

(Continued)

*Primary Examiner* — Fredrick C Conley

(74) *Attorney, Agent, or Firm* — Pizarro Allen PC

(57) ABSTRACT

A therapeutic bed includes stowable prone packs and lateral side supports.

18 Claims, 15 Drawing Sheets

(56) References Cited

U.S. PATENT DOCUMENTS

| | | | | |
|---|---|---|---|---|
| 6,817,363 | B2 | 11/2004 | Biondo | |
| 6,862,759 | B2 | 3/2005 | Hand | |
| 6,862,761 | B2 | 3/2005 | Hand | |
| 6,874,181 | B1 | 4/2005 | Vijayendran | |
| 6,934,986 | B2 | 8/2005 | Krywiczanin | |
| 7,017,211 | B2 | 3/2006 | Krywiczanin | |
| 7,137,160 | B2 | 11/2006 | Hand | |
| 7,191,480 | B2 | 3/2007 | Romano | |
| 7,191,482 | B2 | 3/2007 | Romano | |
| 7,219,379 | B2 | 5/2007 | Krywiczanin | |
| 7,322,059 | B2 | 1/2008 | Hornbach | |
| 7,455,744 | B2 | 11/2008 | Mileti | |
| 7,469,432 | B2 | 12/2008 | Chambers | |
| 7,469,436 | B2 | 12/2008 | Meyer | |
| 7,472,440 | B2 | 1/2009 | Bartlett | |
| 7,478,869 | B2 | 1/2009 | Lazanja | |
| 7,480,953 | B2 | 1/2009 | Romano | |
| 7,578,552 | B2 | 8/2009 | Bajic | |
| 7,617,555 | B2 | 11/2009 | Romano | |
| 7,712,164 | B2 | 5/2010 | Chambers | |
| 7,914,611 | B2 | 3/2011 | Vrzalik | |
| 7,937,791 | B2 | 5/2011 | Meyer | |
| 7,966,680 | B2 | 6/2011 | Romano | |
| 7,992,239 | B2 | 8/2011 | Hornbach | |
| 8,011,041 | B2 | 9/2011 | Hann | |
| 8,118,920 | B2 | 2/2012 | Vrzalik | |
| 8,372,182 | B2 | 2/2013 | Vrzalik | |
| 8,601,620 | B2 | 12/2013 | Romano | |
| 8,856,993 | B2 | 10/2014 | Richards | |
| 8,893,338 | B2 | 11/2014 | McCausland | |
| 8,997,287 | B2 | 4/2015 | Lanning | |
| 9,009,892 | B2 | 4/2015 | Lachenbruch | |
| 9,131,780 | B2 | 9/2015 | Lachenbruch | |
| 9,254,231 | B2 | 2/2016 | Vrzalik | |
| 9,433,300 | B2 | 9/2016 | Gibson | |
| 9,462,893 | B2 | 10/2016 | Romano | |
| 9,463,124 | B2 | 10/2016 | Lachenbruch | |
| 9,538,853 | B2 | 1/2017 | Vrzalik | |
| 9,730,847 | B2 | 8/2017 | Lachenbruch | |
| 9,835,344 | B2 | 12/2017 | Vrzalik | |
| 9,907,408 | B2 | 3/2018 | Vrzalik | |
| 9,913,770 | B2 | 3/2018 | Lachenbruch | |
| 10,172,470 | B1 | 1/2019 | Vrzalik | |
| 10,265,231 | B2 | 4/2019 | O'Reagon | |
| 2002/0138905 | A1 | 10/2002 | Bartlett | |
| 2002/0138906 | A1* | 10/2002 | Bartlett ................. | A61G 7/018<br>5/609 |
| 2004/0168253 | A1 | 9/2004 | Hand | |
| 2004/0226091 | A1 | 11/2004 | Hand | |
| 2005/0022308 | A1 | 2/2005 | Totton | |
| 2005/0081300 | A1 | 4/2005 | O'Reagan | |
| 2005/0086739 | A1 | 4/2005 | Wu | |
| 2005/0229317 | A1 | 10/2005 | Heiser | |
| 2006/0010608 | A1 | 1/2006 | DeFranks | |
| 2006/0016007 | A1 | 1/2006 | Hornbach | |
| 2006/0112491 | A1 | 6/2006 | Buehner | |
| 2006/0112826 | A1 | 6/2006 | Ichigaya | |
| 2006/0123546 | A1* | 6/2006 | Horton ............... | A61G 13/0054<br>5/624 |
| 2007/0261548 | A1 | 11/2007 | Vrzalik | |
| 2009/0056030 | A1 | 3/2009 | Bolden | |
| 2010/0146709 | A1 | 6/2010 | Lafleche | |
| 2010/0274331 | A1 | 10/2010 | Williamson | |
| 2011/0024076 | A1 | 2/2011 | Lachenbruch | |
| 2011/0308020 | A1 | 12/2011 | Vrzalik | |
| 2013/0074272 | A1 | 3/2013 | Lachenbruch | |
| 2013/0198955 | A1 | 8/2013 | Lishnevsky | |
| 2013/0212808 | A1 | 8/2013 | Lachenbruch | |
| 2013/0298330 | A1 | 11/2013 | Lachenbruch | |
| 2017/0007482 | A1 | 1/2017 | McKnight | |

FOREIGN PATENT DOCUMENTS

| | | |
|---|---|---|
| EP | 1987806 | 6/2009 |
| EP | 3424478 | 1/2019 |
| WO | 1997018157 | 5/1997 |

* cited by examiner

STOWABLE PATIENT SUPPORTS

CROSS-REFERENCE TO RELATED APPLICATIONS

This application claims priority to U.S. Provisional Patent Application No. 63/176,145 titled "Therapeutic Apparatuses Including Stowable Patient Supports" filed Apr. 16, 2021. The full disclosure of the aforementioned patent application is herein fully incorporated by reference.

FIELD

This invention relates to patient support for prone therapy.

BACKGROUND

Known prior art apparatuses used to orient a patient in a prone position have a number of deficiencies. For example, prior art apparatuses may present one or more obstructions which require a caregiver to manually lift a patient or a patient's limbs when transferring a patient to or from a support surface. Some prior art apparatuses may be adjustable so as to remove at least some obstructions in order to help a caregiver move a patient. However, complete removal of obstructions may typically require that one or more supports be detached or otherwise incompletely moved so that they remain an obstruction or prevent adjacent apparatuses from being positioned next to each other without a gap therebetween.

There is a need for improved therapeutic beds, tables and the like that may be easily adjusted so as to remove obstructions so as to facilitate patient movement. There is a particular need for therapeutic beds wherein both lateral and anterior supports may be stowed so as to avoid obstructing patient movement during patient transfer.

SUMMARY

A therapeutic bed comprises a frame configured to rotate a patient; and a side support rotatably and translatably coupled to the frame, the side support being rotatable between a deployed position in which the side support restricts lateral movement of a patient when the patient disposed on a first side of the frame, and a stowed position in which the side support is positioned at a second side of the frame opposite the first side of the frame.

The therapeutic bed further comprises a prone pack rotatably and translatably coupled to the frame, the prone pack being rotatable between a deployed position in which the prone pack restrains the patient when the side support is in the deployed position, and a stowed position in which the prone pack is positioned at the second side of the frame so as to permit the side support to rotate to the stowed position.

DETAILED DESCRIPTION

This disclosure is directed to stowable patient supports for therapeutic beds configured for prone therapy. To provide context for describing the structure and function of various embodiments of a stowable patient support, the disclosure turns first to an overview of an embodiment of a therapeutic bed in which a stowable patient support may be suitably provided.

Therapeutic Bed

Figure 1:
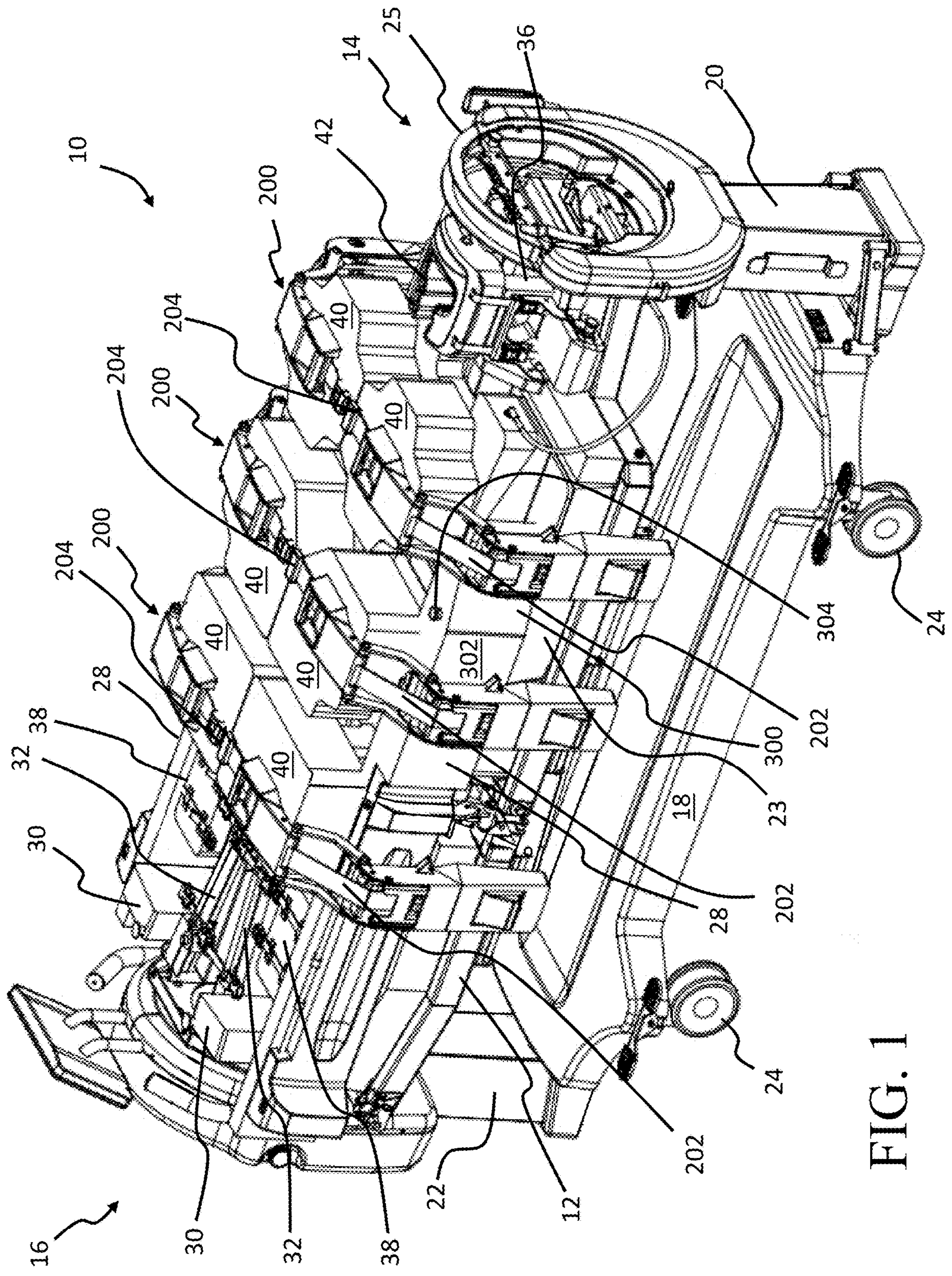
FIG. 1 illustrates an embodiment of a therapeutic bed configured for prone therapy.

FIG. 1 illustrates an embodiment of a therapeutic bed 10 configured to support a patient (not shown) for prone therapy and/or kinetic therapy. Therapeutic bed includes a patient support frame 12 having a head end 14 and a foot end 16. The patient support frame is coupled to a caster frame 18 by a first lift column 20 at the head end and by a second lift column 22 at the foot end. The caster frame may be supported by a plurality of casters 24 for bed mobility.

The therapeutic bed embodiment of FIG. 1 may move a patient through primarily two therapeutic modes of movement: a rotational mode and a tilt mode. To provide a rotational mode of movement, the patient support frame may be rotated about a long axis extending through the foot end and the head end of the patient support frame. The rotational mode of movement permits a patient to be rotated from a supine (face up) orientation to a prone (face down) orientation. The rotational mode of movement may further permit a patient to be oscillated through a range of angular positions in either or both of the supine or prone orientations. The rotational mode of movement may further permit rotation through more or less than 360°.

To permit rotational movement, the patient support frame may be rotatably coupled to the lift columns. For example, the foot end of the patient support frame may be coupled to lift column 22 by any suitable means, such as through a plate, saddle, and actuator (not shown). Other suitable means for providing rotatable coupling between the lift column 22 and patient support frame may be used, such as those described in U.S. Pat. No. 6,862,759, for example, which is herein incorporated by reference. The head end of the patient support frame may comprise a hoop 25, which may be coupled to a lift column 20 using any suitable means. For example, the patient support frame may rest on a roller support coupled to a saddle (not shown) with the saddle coupled to the lift column 20. A drive system (not shown), such as an electrical motor and drive belt, and electronic controls may be used to selectively rotate the patient support frame. Of course, other suitable means for rotatably coupling the patient support frame and lift column 20 may be used. In some modes of operation, the patient support frame may be manually rotated.

To provide a tilt mode of movement, the length of each lift column may be independently adjusted so as to raise and lower the head end of the patient support frame independently of the foot end, or to raise and lower the foot end of the patient support frame independently of the head end. Furthermore, the length of each lift column may be adjusted so as to raise or lower the entire patient support frame with respect to the caster frame. That is, the distance between either or both end of the patient support frame and the caster frame may be adjusted. To permit tilt movement, lift column height may be adjusted by any suitable mechanism, such as by hydraulics, screw, gas spring, coil spring, ratchet or removable pin.

Patient Constraint

When the patient support frame is oriented to support a patient in a supine position, the patient may rest on one or more patient support pads 23 disposed on the patient support frame 12. The one or more support pads 23 may provide a patient support surface 26 to support the patient (not shown in FIG. 1). However, when the patient support frame is moved through one or more modes of movement, the patient must be constrained from sliding or falling from the patient support frame. A variety of packs may be provided to constrain a patient during bed movement.

A plurality of lateral packs may constrain the patient's legs, torso, arms and head from lateral movement with respect to the patient support surface. Such lateral packs may include, for example, side support packs 28, foot packs 30, abductor packs 32, and head packs 36.

A plurality of prone packs may prevent a patient from falling from the bed when the patient is rotated to a prone position. Such prone packs may include, for example, leg packs 38, torso or thigh packs 40 and a face pack 42. As described herein, prone packs and side support packs may be stowed and deployed cooperatively without need for removal of either such prone packs or support packs from the bed.

The term "pack" as used herein refers to a structure that is firm enough to substantially maintain its shape while supporting the patient's body but is also soft so as to comfortably support the patient's body. A pack may, for example, be comprised of a rigid support panel or other structure surrounded by a padding. A pack may be comprised of one or more layers. A pack may comprise a single type of padding. Alternatively, a pack may comprise several different padding materials such as may be used such as to provide a desired level of support in different parts of a pack. For example, a pack may be comprised of materials with more than one spring rate or initial force deflection rating so as to control a level of immersion of the pack around the patient's body. A pack may be shaped to receive a part of the patient's body. For example, a support pack may be generally shaped to contour a patient's legs, forehead, cheeks, or other body part against which it is designed to be disposed. In some embodiments, a pack may be shaped and/or made of materials with controlled properties (e.g., initial force deflection, spring rate, and other properties) so as to reduce any shearing stresses that tend to be formed on the patient's skin when a patient's body is immersed in the pack. A pack may, for example, be filled with a pressurized gas (such as air), foam, a gel, a viscous fluid, or another suitable material.

Patient Access

When the patient support frame is rotated to orient a patient in the prone position, a caregiver may require access to the patient through the patient support frame. The patient support frame may be provided with panels that a caregiver may open to allow access to the patient's body.

Side Support Stowage and Deployment

In view of the foregoing context, a more detailed description of various embodiments of a stowable patient supports may now be provided. However, the foregoing embodiments of therapeutic beds and various features and functions thereof should not be interpreted as limiting. Any stowable patient supports as described herein may be used with any therapeutic bed in which a patient may be positioned or placed in a prone or face down position or in which a patient may be treated with rotation therapy.

Figure 2:
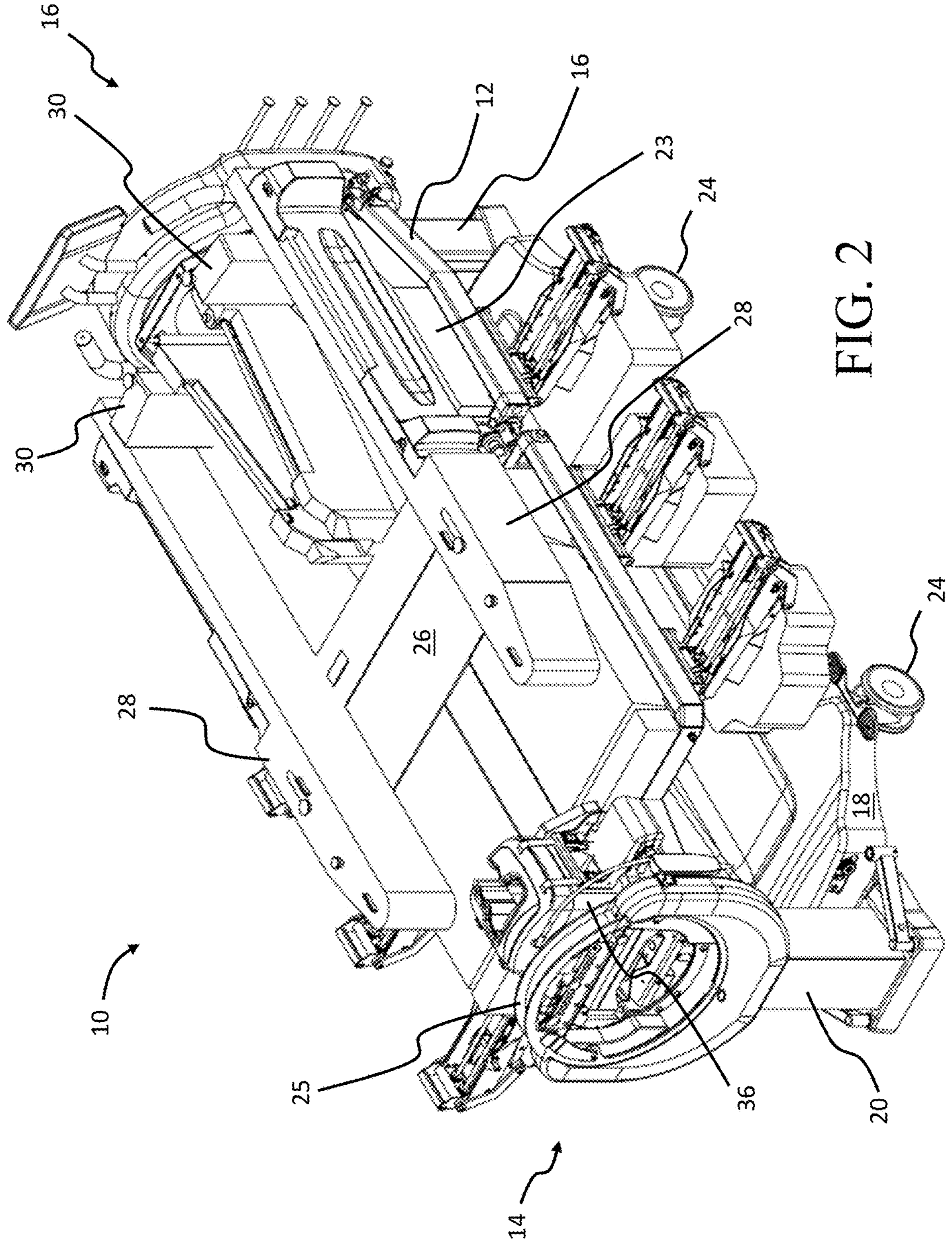
FIG. 2 illustrates the embodiment of FIG. 1 with deployed side supports and stowed prone packs.

FIG. 2 illustrates the side support 28 in a deployed position that constrains the patient (not shown) from lateral movement with respect to the patient support frame 12. In the embodiment of FIG. 2, the side support 28 is coupled to the patient support frame 12 approximately at the midpoint of the patient support frame and at the foot end 16 of the patient support frame. The side support 28 may also be referred to as an adductor support.

A side support 28 may comprise one or more packs or panels configured to limit patient movement laterally or side-to-side, including when the patient is lying in a supine position, when the patient is rotated, or both. Some side supports 28 may provide a padded surface which may be contoured or shaped to help provide lateral patient support and at least some level of support of a patient's leg so as to limit movement in the anterior direction. The side support 28 may be moved laterally toward or away from the patient's body so as to better secure the patient and minimize lateral or anterior patient motion. In some embodiments, side supports 28 may be held in position by a pair of lockable pneumatic gas springs or the side supports may be held in place in some other suitable way, such as using a locking pin, for example.

Figure 3:
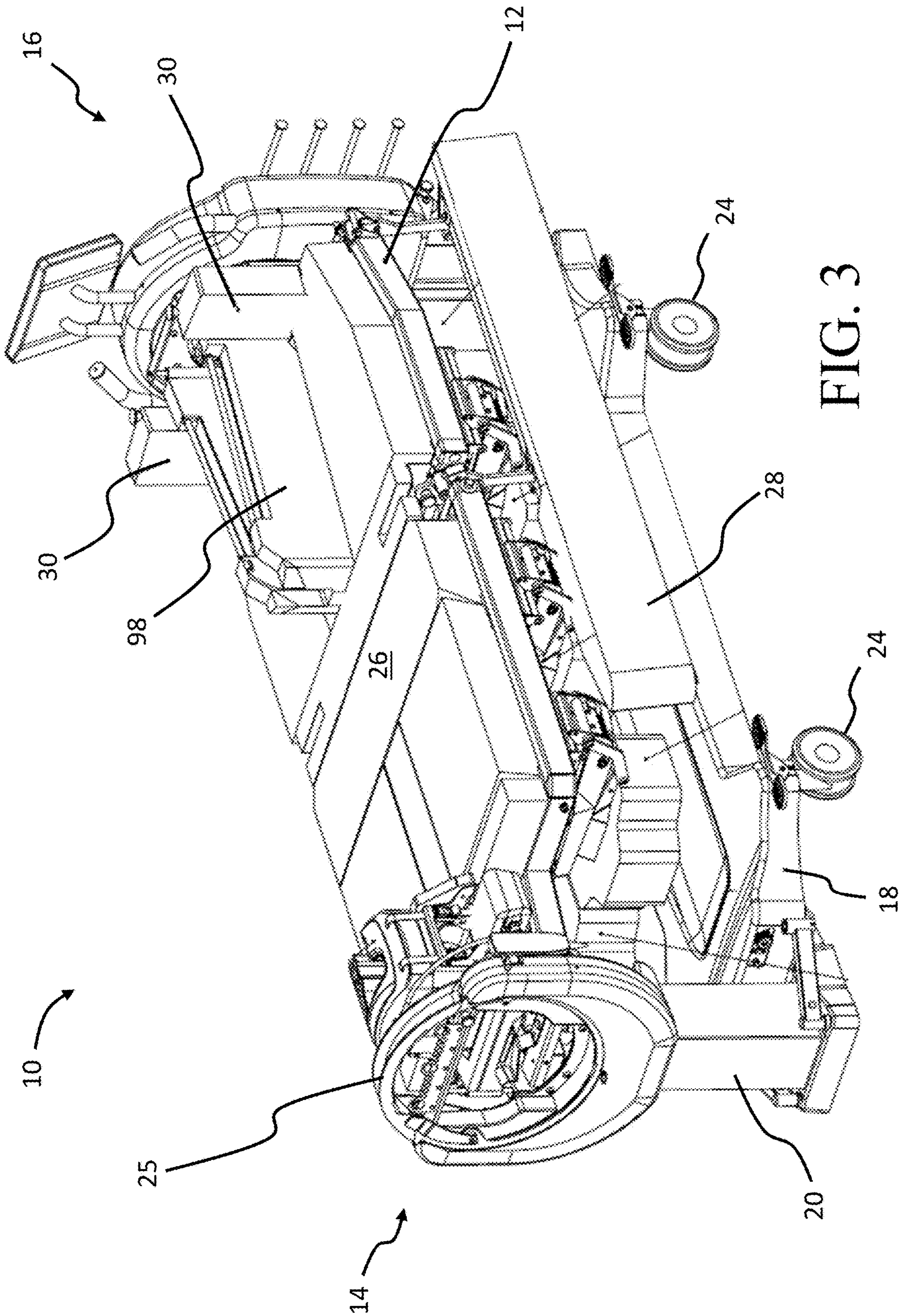
FIG. 3 illustrates the embodiment of FIG. 1 with stowed side supports and stowed prone packs.
Figure 4:
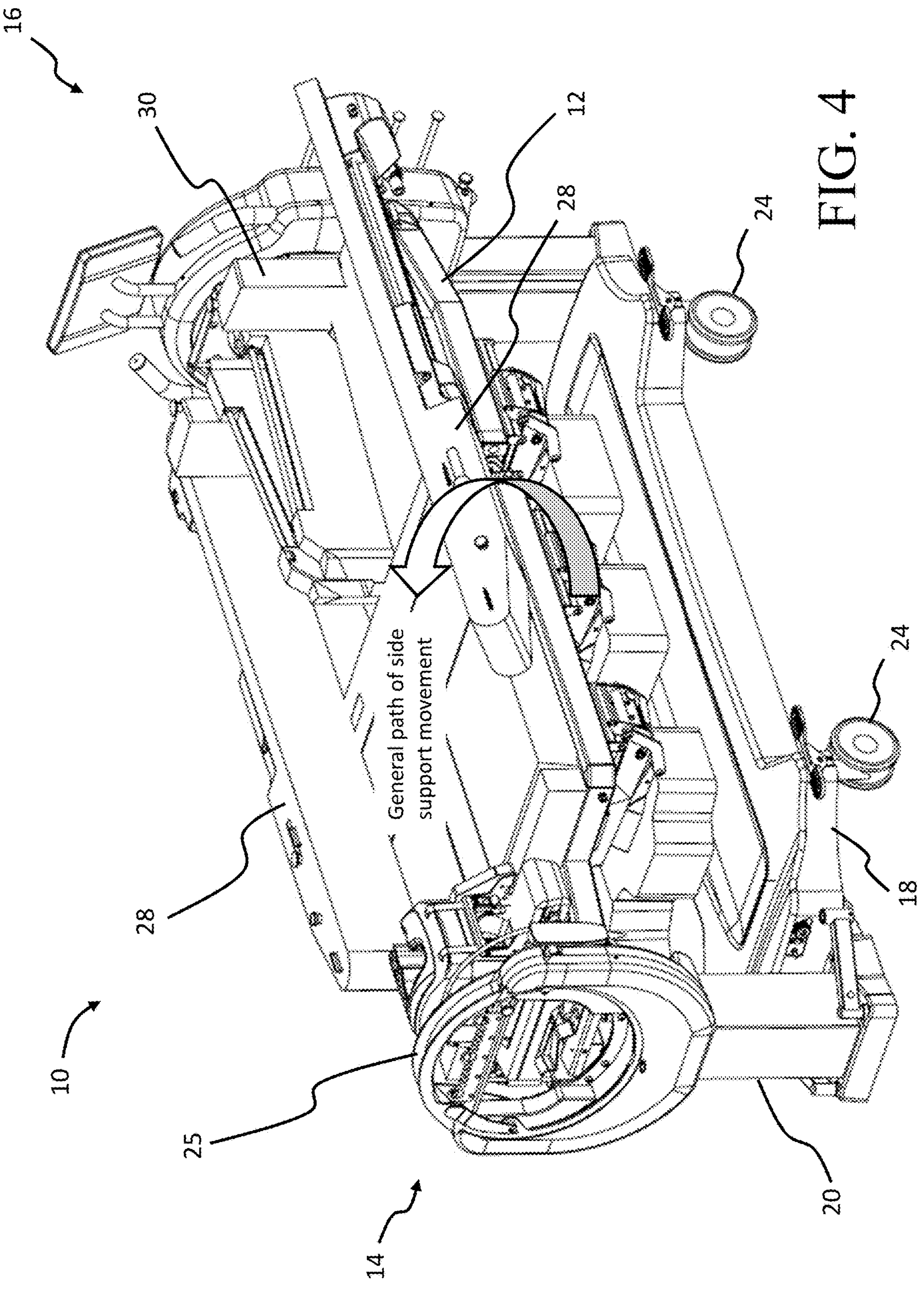
FIG. 4 illustrates movement of a side support from a stowed position to a deployed position.

FIG. 3 illustrates the side support 28 in a stowed position so as to permit a patient to slide across the patient support frame 12 without obstruction from the side supports 28. Other packs or supports that may impede patient movement may also be removed. For example, in some embodiments, therapeutic bed 10 may include an inner leg support assembly 98. The inner leg support assembly 98 may be internally stowed or otherwise easily removed from a path of patient travel as described more completely in U.S. patent application Ser. No. 17/723,143, titled "Stowable Inner Leg Supports" filed on Apr. 18, 2022, concurrently with this application, the contents of which are herein incorporated by reference. FIG. 4 illustrates movement of the side support 28 from a stowed position to a deployed position. The side support 28 may thus be stowed so that a patient may be readily moved from the patient support surface 26 without need for removing the side support.

The side support 28 may be rotated with respect to the patient support frame 12 between the deployed position and the stowed position. In the deployed position, the side support 28 is oriented approximately perpendicular or at an angle to the patient support frame 12 so as to support the side of a patient lying supine on the therapeutic bed 10. In the deployed position, the side support 28 may be translated across the patient support frame 12 to accommodate different patients of different width. For example, in some embodiments, the side support 28 may accommodate patients of different widths by moving in a swinging motion with one end of the side support (i.e., the end closer to the patient's head and about aligned with the patient's armpit) moving towards or away from the patient and a second end of the side support (i.e., the foot end of the side support) remaining in place during this movement. In some embodiments, the second end of the side support may also move. The side support 28 may also be translated away from the patient support frame 12 to permit the side support to be more easily moved to the stowed position as further explained herein.

Figure 5:
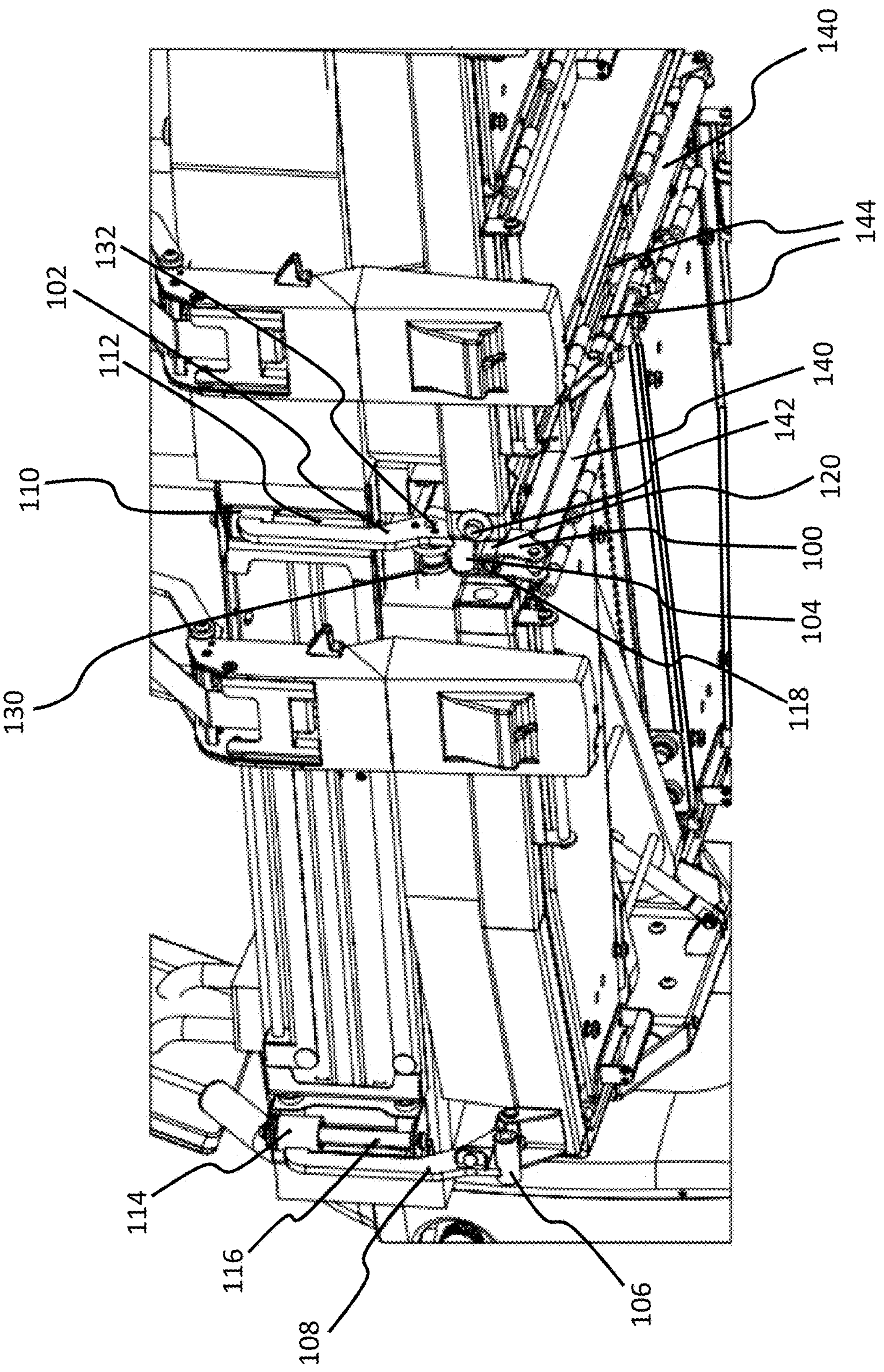
FIG. 5 illustrates a rotational and translatable coupling of a side support to a patient support frame.

Turning to the embodiment of FIG. 5, the side support 28 is rotatably and translatably coupled to the patient support frame 12. With respect to rotatable coupling, the side support 28 may be rotatably coupled to the patient support frame 12 at any suitable point along the frame, and may be rotatably coupled to the patient support frame 12 at one or more pivot points. In the embodiment of FIG. 5, the side support 28 is coupled to the patient support frame 12 by an adductor carriage 100 disposed at the approximate midpoint of the patient support frame. The side support 28 is rotatably coupled to the adductor carriage 100 by a first adductor arm 102. The first adductor arm 102 rotates with respect to the adductor carriage 100 at a first pivot 104. The side support 28 is further coupled to the patient support frame 12 at a second pivot 106 disposed at an end of the patient support frame. The side support 28 is rotatably coupled to the second pivot 106 by a second adductor arm 108. The pivots 104, 106 allow the side support 28 to rotate between a deployed position adjacent the patient on the side of the patient support frame 12 supporting the patient, and a stowed position to the opposite side of the patient support frame 12.

Figure 22:
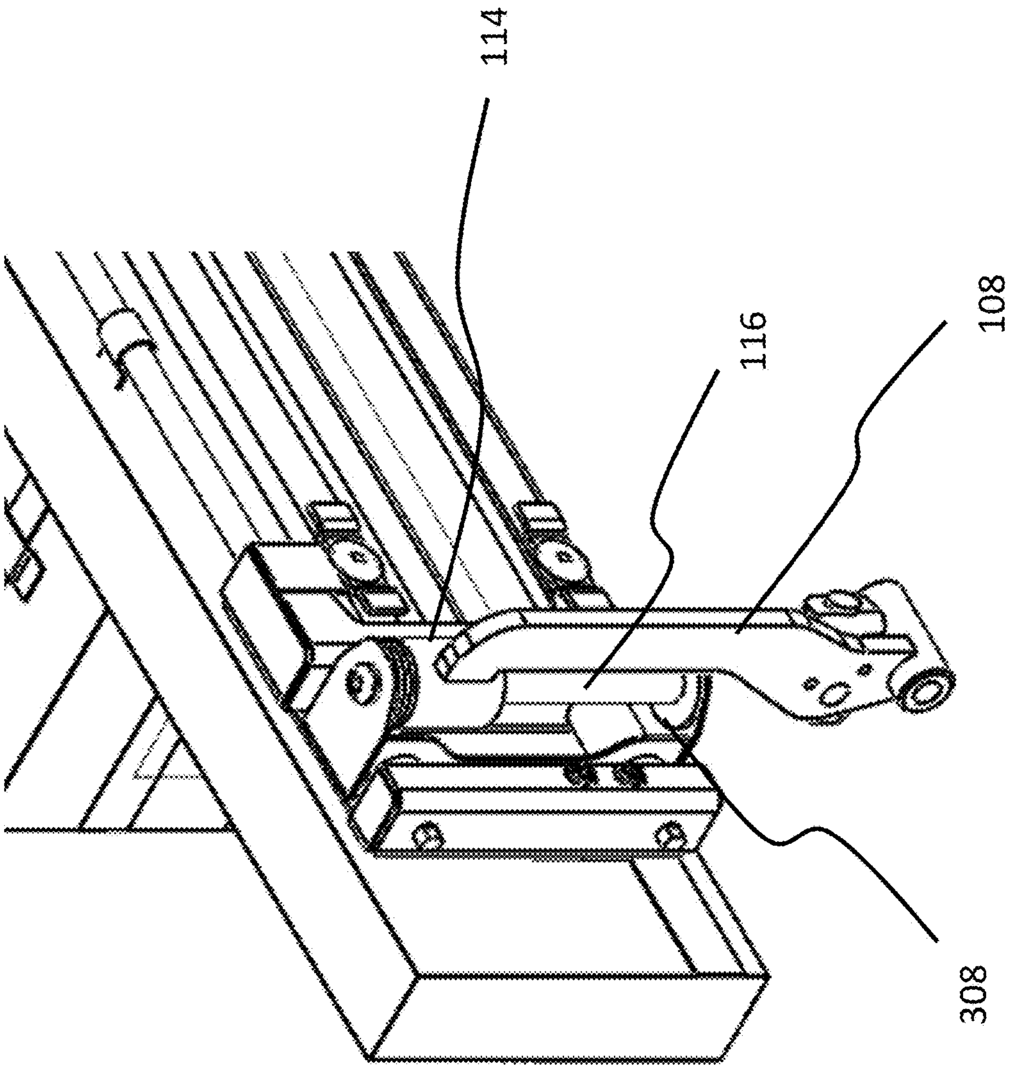
FIG. 22 shows another view of an embodiment of a side support.

With respect to translatable coupling, the side support 28 is translatably or slidably coupled to the adductor arms 102, 108 by slide rods 112, 116 and slide bearings 110, 114. The first adductor arm 102 includes a first slide bearing 110 translatably coupled to a first slide rod 112. The second adductor arm 108 includes a second slide bearing 114 translatably coupled to a second slide rod 116. Each slide bearing 110, 114 may translate along the slide rod 112, 116 to which it is coupled, thus allowing the side support 28 to be translated with respect to the patient support frame 12. When the side support 28 is in the deployed position, the side support may be raised or lowered with respect to the patient support surface 26. Such range of motion may be useful in clearing the side support 28 away from the frame 12 and interfering bed components for rotation with respect to the patient support frame. In some embodiments, the side support 28 may be configured to automatically adjust its vertical position during rotation of the patient to accommodate for changes in position of the patient. For example, when the patient support frame 12 is rotated from a supine position to a prone position, gravity will no longer urge the patient towards the support surface 26. Accordingly, the patient may move away from the support surface 26 during rotation to a prone position. The position of the side support 28 may similarly shift under force of gravity in a. When the patient support frame 12 is in the prone position, the patient may fall from the support surface 26 and be supported by prone packs. The side supports 28 may likewise slide away from the support surface 26. That is, the side support 28 may slide on the bearing 110, 114 so as to align with the patient's new position. For example, as shown in FIG. 22 the side support 28 translate with respect to the adductor arm 108 when the patient is moved to a prone position until it contacts the stop 308.

The adductor carriage 100 provides an additional degree of translational movement of the side support 28 with respect to the patient support frame 12. The adductor carriage 100 is translatably coupled to the patient support frame 12 through a frame slide rod 118. In the embodiment of FIG. 5, the frame slide rod 118 is fixed at each end to the patient support frame 12 (fixed couplings not shown). The adductor carriage 100 is slidably coupled to the frame slide rod 118 by a slide or linear bearing 120. The frame slide rod 118 may be fixed at one end (an outer end) at or near an edge of the patient support frame 12 so as to provide a travel stop (not shown to better describe carriage details) for the carriage 100 as it translates along the frame slide rod 118 away from the longitudinal axis (axis of rotation) of the patient support frame 12. In one embodiment, the travel stop prevents further translation of the carriage 100 at a point in which the rotational axis of each of the pivots 104 and 106 are aligned so as to permit rotation of the side support 28 to a stowed position. The frame slide rod 118 may be fixed at a second end (an inner end) to the patient support frame 12 at a point within the perimeter of the patient support frame. The frame slide rod 118 may be sufficiently long to allow translation of the side support across the patient support surface to meet the side (such as a limb) of a relatively narrow-framed patient. In some embodiments, such translation may be several inches. The slide rod length will thus allow the side support 28 to translate across the patient support surface 26 to accommodate a wide range of patient widths.

In the embodiment of FIG. 5, when the side support 28 is in the deployed position, the second slide bearing 114 will allow the side support to rotate about the second slide rod 116 when the adductor carriage 100 translates along the frame slide rod 118. The frame slide rod 118 may thus be oriented with respect to the patient support frame 12 so as to accommodate a slight arc of travel as the deployed side support traverses the major plane of the patient support frame. That allows the side support 28 to be moved toward or away from the side of a patient lying supine on the patient support surface 26. Thus, the frame slide rod 118 may be oriented at a slight angle to the longitudinal axis (axis of rotation) of the patient support frame 12. In other embodiments, the frame slide rod 118 may be oriented perpendicularly to the longitudinal axis of the patient support frame 12, and sufficient play may be provided in the rotational and translatably couplings to accommodate slightly non-linear travel.

Figure 21A:
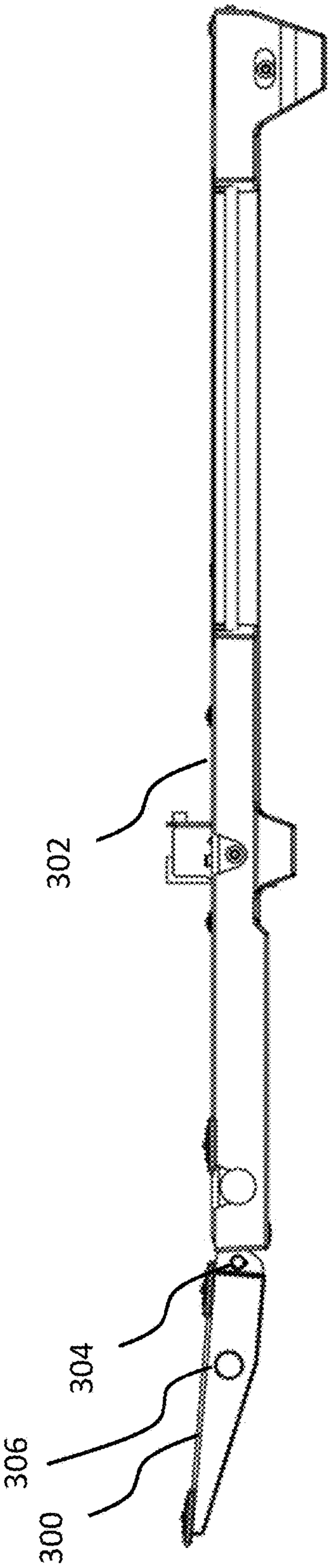
FIGS. 21A-21C show an embodiment of a side support including a hinge.
Figure 21B:
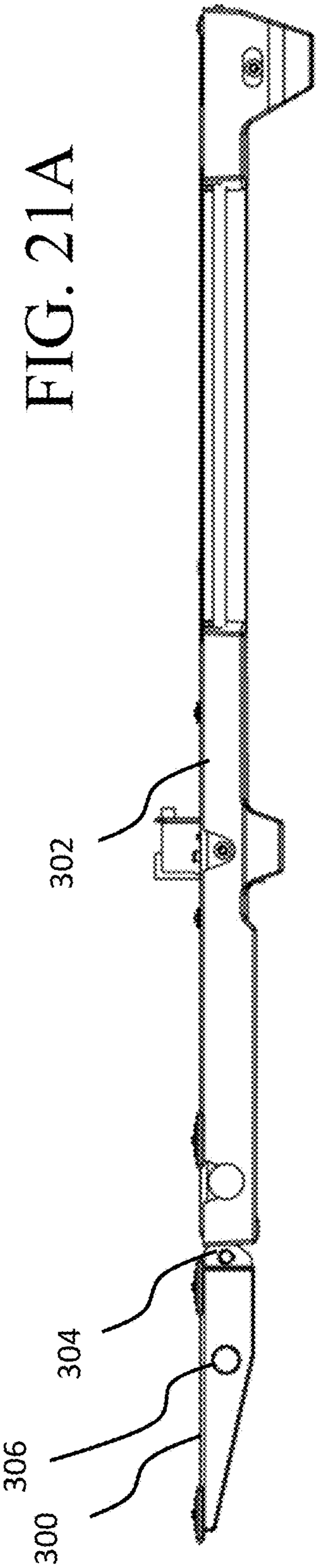
Figure 21C:
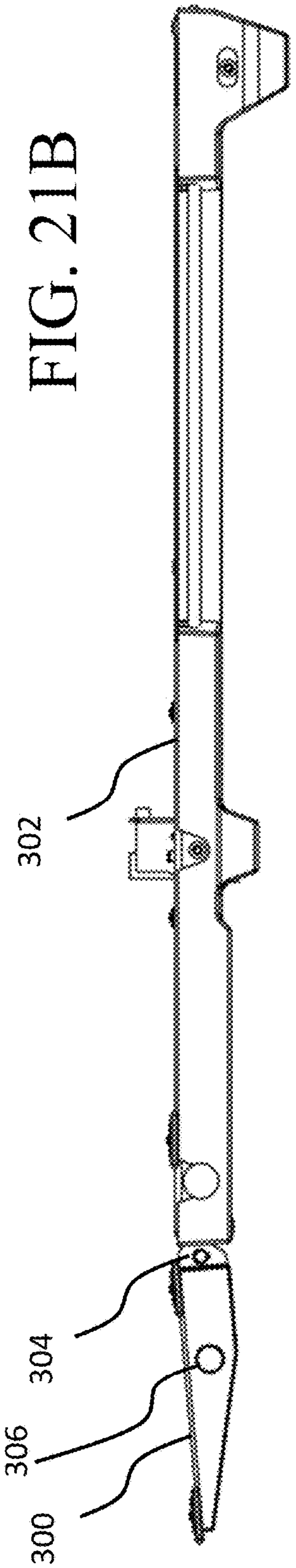

FIGS. 21A-21C shows top-down views of the side support 28. As shown therein, the side support 28 may comprise a first panel 300 and a second panel 302, the panels 300, 302 being pivotably connected at a hinge 304 to provide an additional degree of freedom for adjusting the side support 28. The first panel 300 may be deployed towards the head end 14 side of the support frame 12 (about at the patient's arm pit), and the second panel 302 may be deployed towards the foot end 16 of the support frame. The side support 28 may include a spring-loaded pin 306 attached to the first panel 300. The spring-loaded pin 306 may be coupled to an internal bracket (not shown) which is matched to the second panel 302. However, any other suitable structure for selectively locking or unlocking the panels 300, 302 with respect to rotation about the hinge 304 may be used. By pulling the spring-loaded pin 306, a user may disengage the first panel 300 from the second panel 302 so as to enable rotation of the panels 300, 302 with respect to each other.

In other embodiments, a second adductor carriage may be used at the foot end of the patient support frame in place of the pivot 106 to rotatably couple the side support 28 to the patient support frame. In yet further embodiments, the outer end of the slide rod 118 may be fixed to the adductor carriage 100 and one or more linear bearing 120 may be fixed to the frame 12. In such an embodiment, the inner end of the slide rod 118 may be free. In other embodiments, the travel stop may prevent further translation of the carriage at a point of misalignment of the rotational axes of the pivots 104 and 106. In the case of such misalignment, the slide rods 112 and 116 will allow the side support to translate with respect to the pivots 104 and 106 as the side support 28 is rotated between a deployed position and a stowed position.

Figure 6:
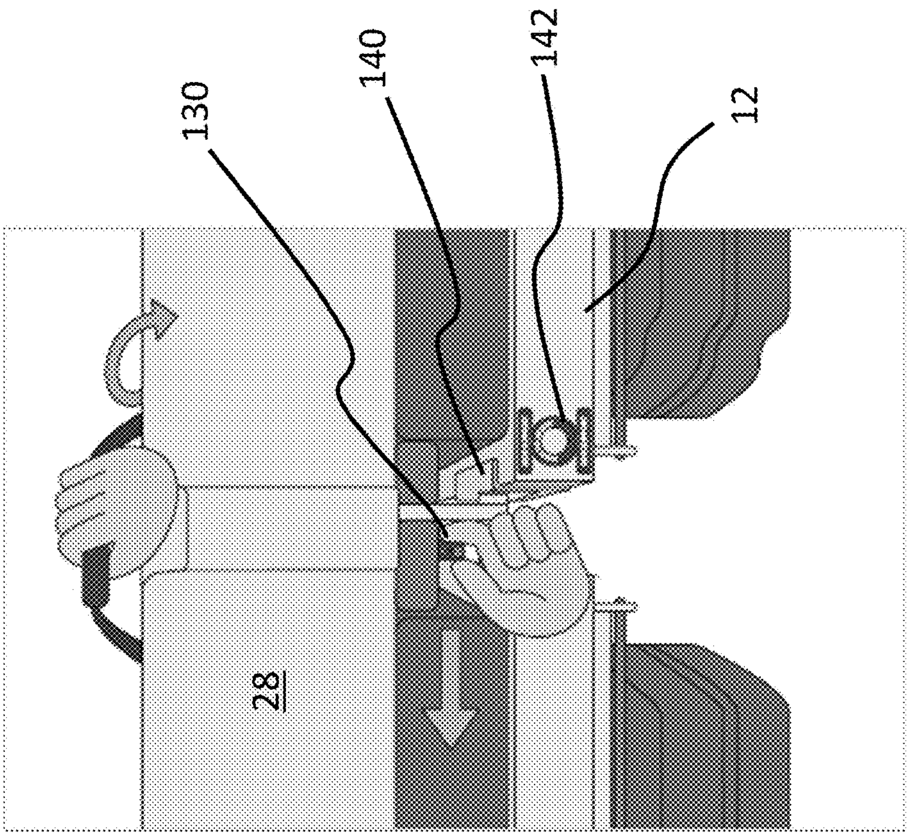
FIG. 6 illustrates unlocking a side support for rotation from a stowed position to a deployed position.

The side support 28 may be selectively locked against rotation by an adductor pin mounted to the adductor carriage 100. In the embodiment of FIG. 5, the adductor pin 130 is received in an aperture formed in an adductor arm, thereby locking the adductor arm against rotation with respect to the patient support frame. In some embodiment, only a single adductor pin 130 may be used with one adductor arm 102, the adductor pin 130 being received in an aperture 132 in the adductor arm 102. In other embodiments, more than one adductor pin 130 may be used, e.g., one pin for each adductor arm. As may be seen in FIG. 6, the adductor pin 130 may be retracted from the aperture so as to free the side support for rotation about the pivots.

The carriage 100 may be selectively locked against translation along the frame slide rod 118 by an adductor gas spring 140. The gas spring 140 may be disposed parallel to the frame slide rod 118. The gas spring 140 is coupled at one end to the carriage 100 and at the other end to the frame 12. The gas spring 140 may be operated by depressing a release button 142. The gas spring valve can be opened or closed by the release button 142 to allow gas to pass from one internal chamber of the gas spring to another. When this valve is opened, the gas spring 140 can be extended or retracted. When the valve is closed, the gas spring 140 may be held rigidly so that it cannot be extended or retracted. The gas spring 140 may also be configured to provide a desired extension force. The adductor gas spring 140 may thus be transitioned between 2 states “locked” and “freely extendable”, using the release button 142 which actuates a valve of the gas spring. In the “freely extendable” state, the side support 28 can be moved laterally with ease. In the “locked” state, the side support 28 may provide patient support so that the patient is securely constrained for rotation. The locking feature and extension force allows the side supports 28 to be locked in a variety of deployed positions, and to be released for movement to a stowed position. In the unlocked/movable state, the side support 28 can be urged away from the patient the extension force supplied by the gas spring 140. Such extension force can make the side support easier to translate for a caregiver. Thus, when the release button 142 is depressed, the gas spring 140 will permit the side support 28 to move in a controlled manner.

Figure 7:
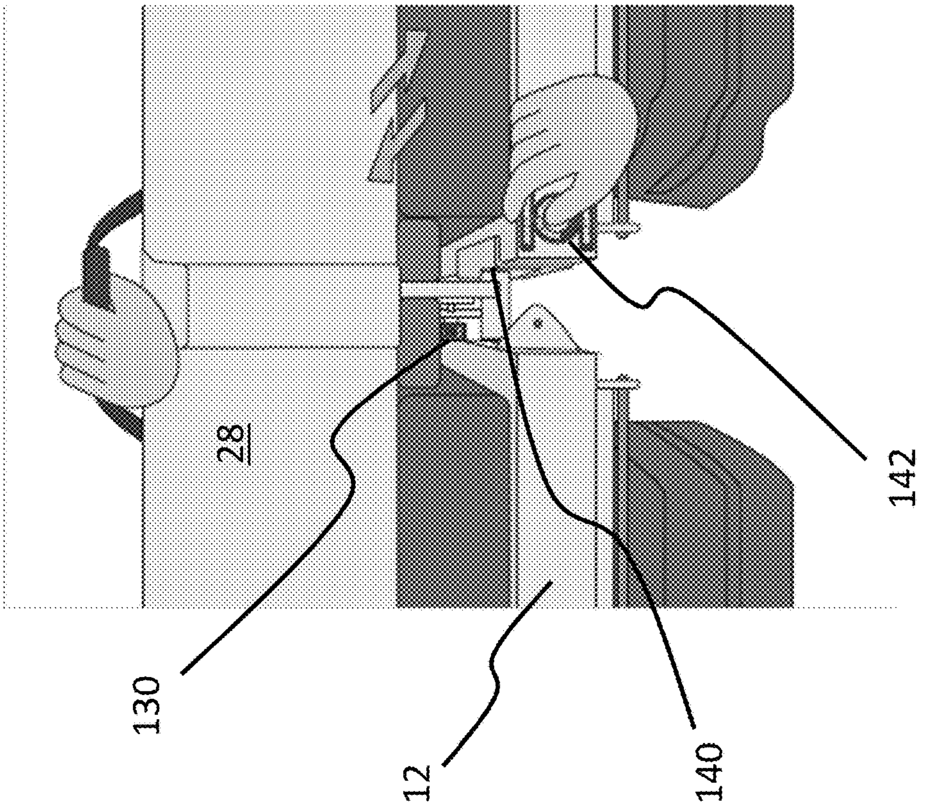
FIG. 7 illustrates unlocking a side support for translation with respect to a patient support frame.

In some embodiments, the gas spring 140 can be activated by a Bowden cable 144, a type of flexible cable that can transmit mechanical force by the movement of an inner cable relative to a hollow outer cable housing. The free end of the Bowden cable 144 can be attached to the release button 142 which allows the valve to be remotely activated via the Bowden cable. For example, as further shown in FIG. 7, the release button 142 may be positioned on the patient support frame 12 such that a user may activate the release button 142 with one hand while using the other hand to move the side support. A selection lever, knob, button, switch, or other suitable selector may alternatively be used to actuate the gas spring 140. In some embodiments, an actuator (e.g., pneumatic, hydraulic, electric, mechanical or other type) could be used in place of a gas spring 140 to provide a translating force to the carriage. The release button 142 could, for example, electrically activate an actuator, such as a motor and gear train, or a powered hydraulic or pneumatic actuator Prone Pack Stowage and Deployment The side support 28 and prone packs 40 may be independently but cooperatively stowed and deployed. As may be see in FIG. 1, the prone packs 40 may be securely deployed across a patient by a strap system. A prone pack 40 may be mounted to a prone pack arm assembly 200 mounted to the therapeutic bed. The prone pack arm assembly 200 is configured to position the prone pack 40 over the body and/or limbs of the patient (not shown). A plurality of prone pack arm assemblies 200 may be used for each therapeutic bed 10. Prone pack arm assemblies 200 may be used singly or in pairs. As may be seen in the embodiment of FIG. 1, prone pack arm assemblies 200 may be used in pairs, with each prone pack arm assembly 200 of the pair being mounted to an opposite side of the therapeutic bed 10 and joined approximately at the midline of the patient. Although prone pack arm assemblies 200 are used only with torso or thigh packs 40 in the disclosed embodiment, such prone pack arm assemblies may be used with other prone packs, such as leg packs 38 and face pack 42.

Regardless of whether used singly or in pairs, the prone pack arm assemblies 200 and associated prone packs 40 may be secured over the patient by a strap system. In other embodiments, the prone pack arm assemblies 200 may include one or more locks instead of or in addition to a strap system to lock the prone pack arm assemblies into the deployed position. The locks may comprise any suitable mechanism, such as pull pin, ball and detent, ratchet, fastener, and the like. The strap system 202 comprises a plurality of straps joined by a connector 204, such as a quick-release connector, an automotive seatbelt-style buckle (as seen in the embodiment of FIG. 1), a side-release buckle or a stab-lock style buckle. The strap system 202 may be released by disengaging a connector 204. A button on the buckle may be depressed to release the buckle. The prone packs 40 may be moved from a deployed position to a stowed position. Moving the prone packs 40 frees the side support 28 for movement from a deployed position to a stowed position. Conversely, moving the side support 28 from a stowed position to a deployed position frees the prone packs 40 for movement from a stowed position to a deployed position. Deployment of the prone packs 40 may help retain the side supports 28 in a deployed position. The prone packs 40 may thus be stowed so that a patient may be readily moved from the patient support surface 26 (after stowage of the side supports) without need for removing the prone packs from the therapeutic bed 10.

In contrast to known prior art therapeutic beds 10 which are not stowable without detaching at least some of the structures used to support the patient during rotation, the side supports 28 and prone packs 40 may be stowed without removal from the therapeutic bed 10. When the side supports 28 and prone packs 40 are stowed, another piece of medical equipment (e.g., an adjacent support surface) may be moved flushed to the patient frame. The therapeutic bed 10 accomplishes stowage without removal by providing for novel paths of travel when stowing the side supports 28 and prone packs. Particularly, the prone packs 40 may be moved around the side support 28 so that the prone packs 40 when stowed do not interfere movement of the side supports. Thus, not only may a patient be transferred to or from the patient support surface 26 without having to lift the patient or patient's limbs over any obstruction but the transfer may be executed without having to traverse any significant gap between the frame and adjacent medical equipment. Notably, in some embodiments, this may be accomplished without having to detach side supports 28 or prone packs 40 from the therapeutic bed 10.

Figure 8:
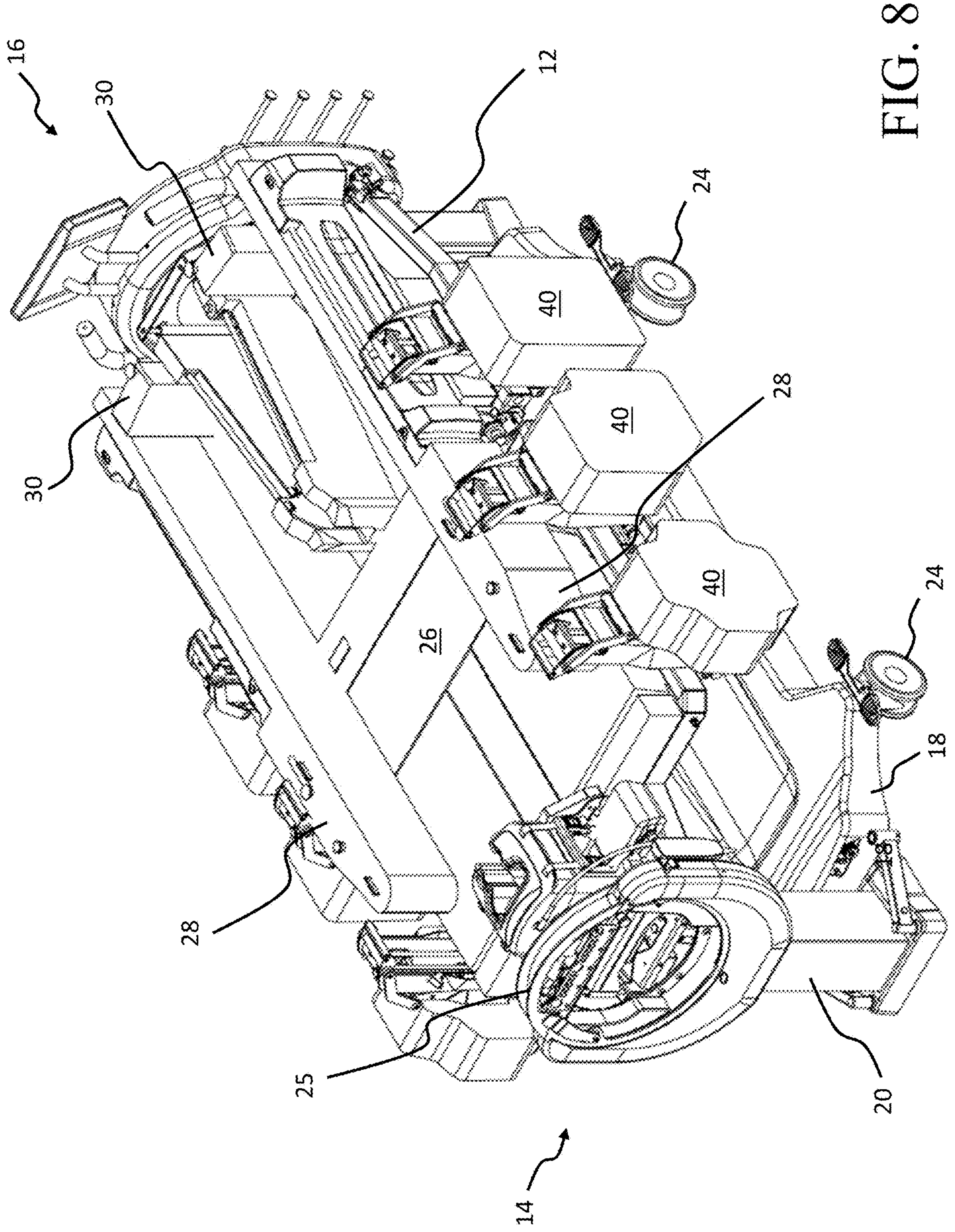
FIG. 8 illustrates the embodiment of FIG. 1 with deployed side supports and partially deployed prone packs.
Figure 9:
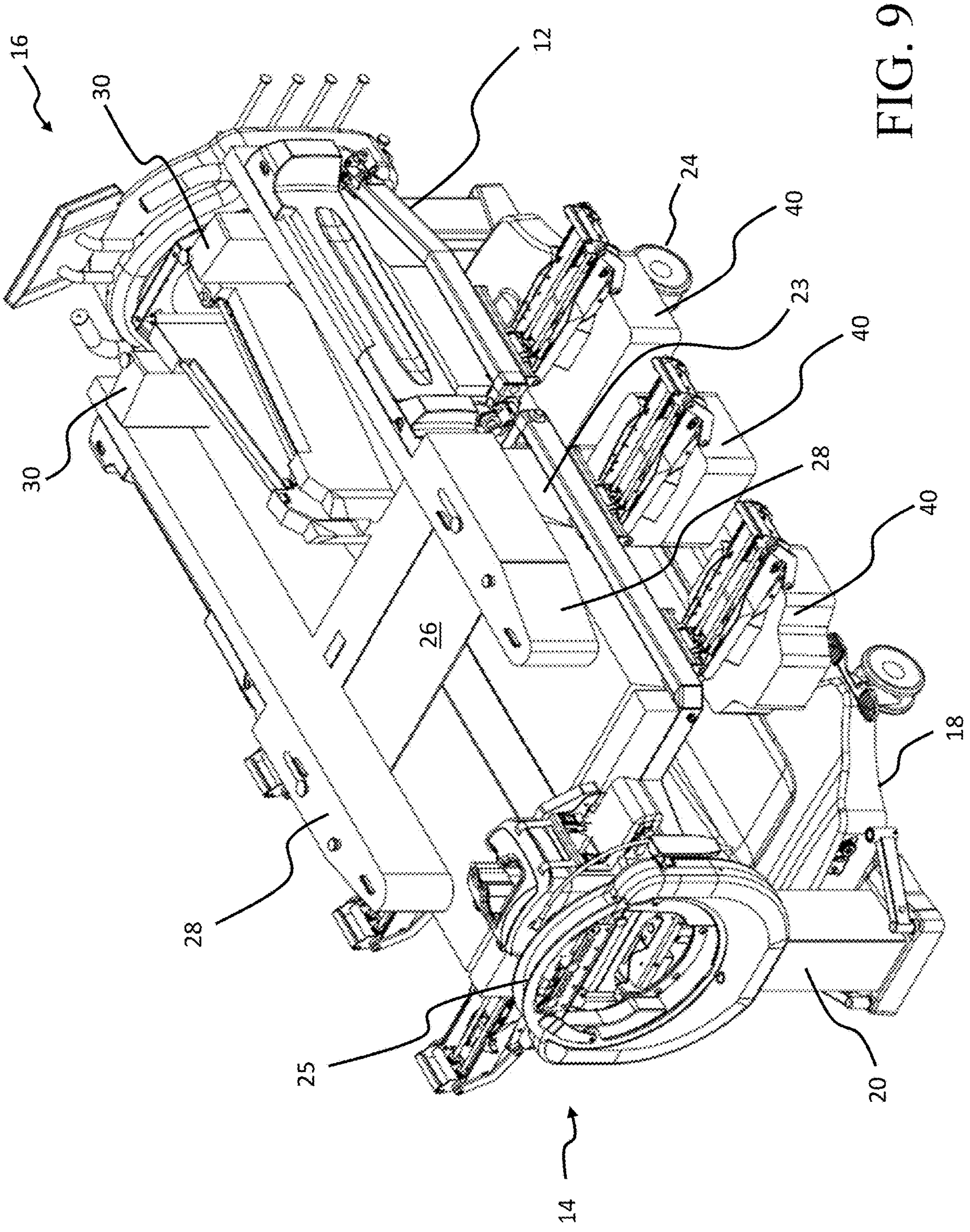
FIG. 9 illustrates deployed side supports and prone packs positioned for stowage under a patient support frame.

As may be seen in the embodiment of FIG. 8, to move the prone packs 40 to the stowed position, the prone packs 40 may first be rotated from over the patient support surface 26 and side supports 28 to the side of the patient support frame 12 outside of the side supports 28. As may be seen in FIG. 9, the prone packs 40 may then be rotated from the side of the patient support frame 12 to below the patient support frame, and from there translated to a stowed position under the patient support frame (see FIG. 4).

Figure 10:
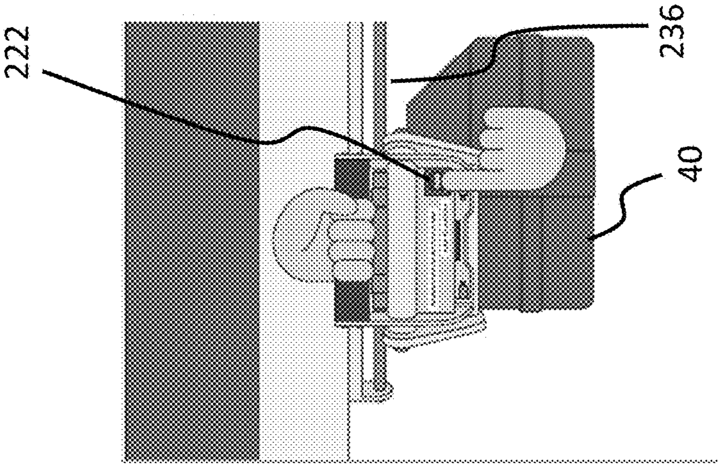
FIG. 10 illustrates unlocking the prone pack for translation out from under the patient support frame.
Figure 11:
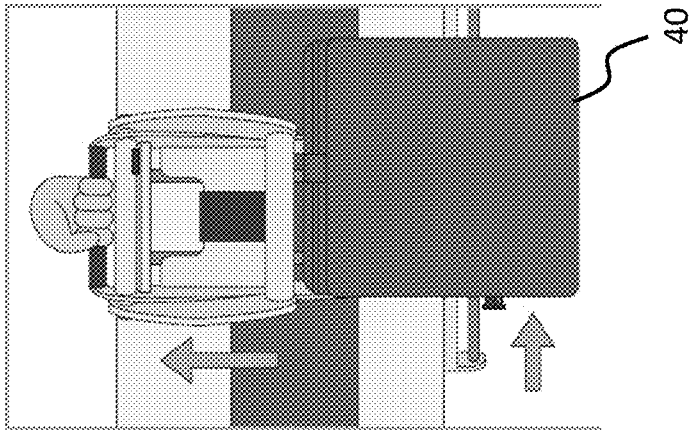
FIG. 11 illustrates rotating the prone pack to vertical position to the side of the patient support frame, and adjusting the prone pack along the patient support frame.
Figure 12:
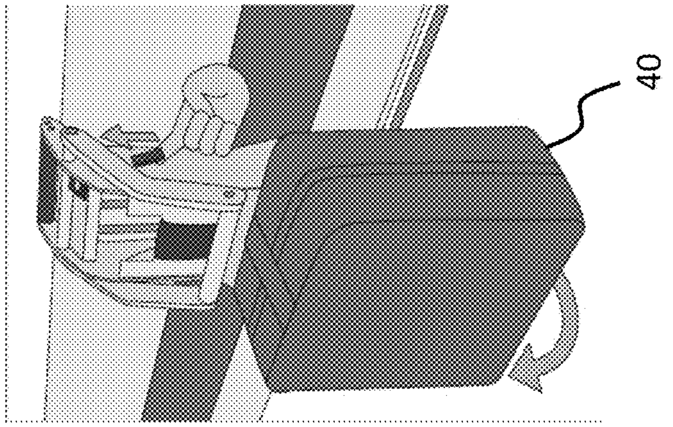
FIG. 12 illustrates unlocking the prone pack for rotation to a deployed position.
Figure 13:
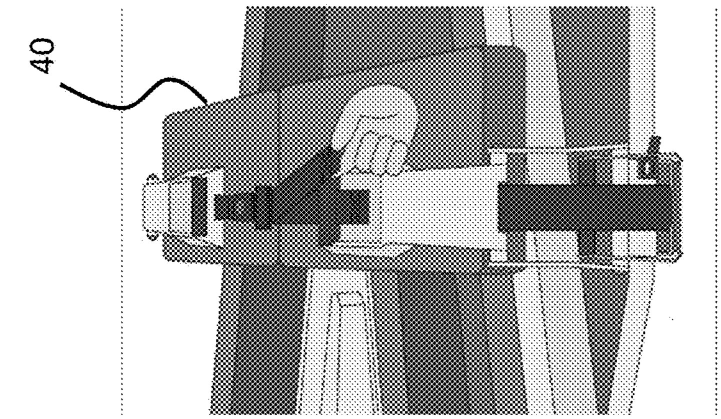
FIG. 13 illustrates buckling the strap system to secure the prone packs to the patient.
Figure 14:
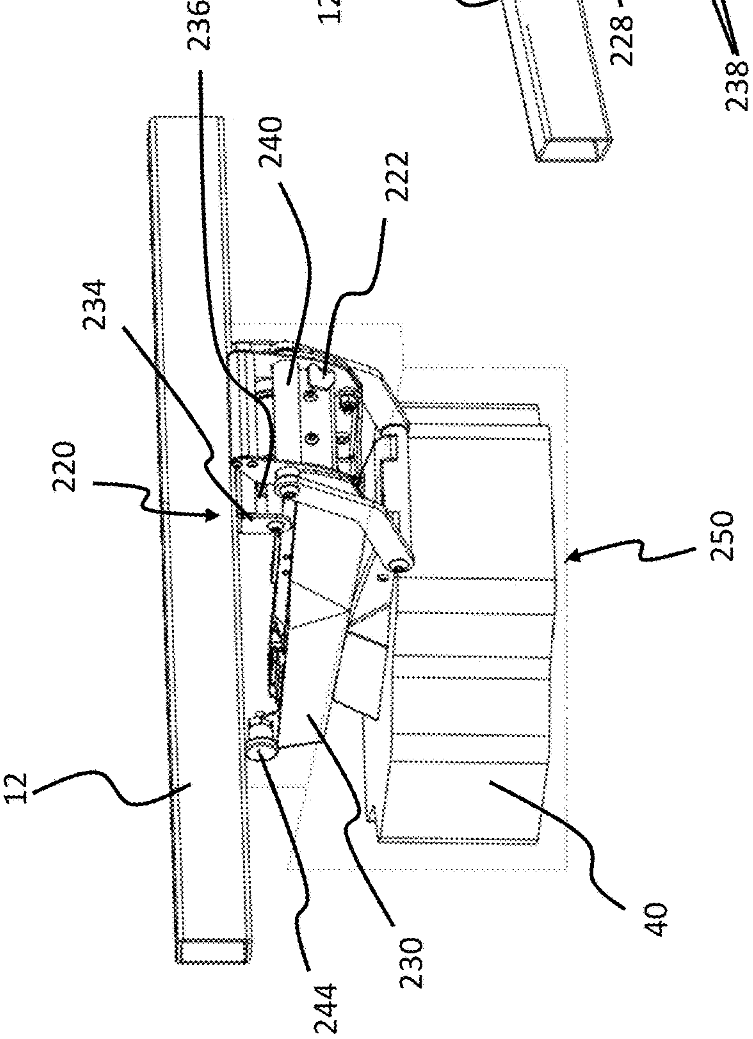
FIG. 14 illustrates a prone pack in a stowed position.

To move the prone packs 40 from the stowed position, the prone packs may be unlocked (e.g., using the release button 222, as shown in FIG. 10 and FIG. 14, for example). and pulled out from under the patient support frame 12 (FIG. 10). The prone packs 40 may then be rotated from below the patient support frame 12 to the side of the patient support frame (FIG. 11). In some embodiments, a prone pack 40 may be translatably coupled to a prone slide bar 236 to permit the prone pack to be moved along a patient's body between head and foot for proper placement thereon. The prone pack 40 may then be rotated from the side of the patient support frame 12 (FIG. 12) to disposition over a patient (not shown) lying on the patient support surface 26 (FIG. 13). In some embodiments, the side support 28 may be adjustable in position (e.g., using the slide rods 112, 116 and associated bearings 110, 114 to change the vertical position of the side support 28) to help clear this path, so that a prone pack 40 may be swung over the side support 28 and then positioned to support a patient. Finally, the buckles of the strap system may be engaged, and the strap system tightened to secure the prone packs 40 over the patient (FIG. 13). The patient support frame 12 may then be rotated to move the patient from a supine position to a prone position. The prone packs 38, 40, 42 will prevent the patient from falling from the therapeutic bed when face down.

FIG. 14 illustrates a prone pack 40 in a stowed position. The prone pack 40 is rotatably and translatably coupled to the patient support frame 12 through an arm assembly 220 and support pack assembly 250. The support arm assembly 220 and support pack assembly 250 are each approximately demarcated by a dot-dash line.

Figure 15:
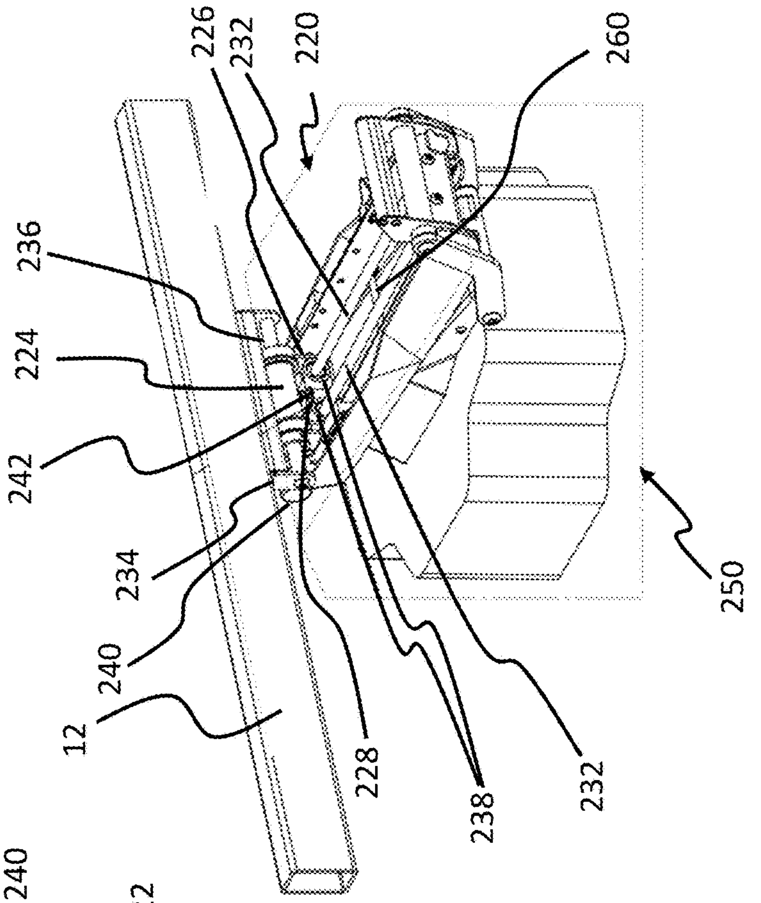
FIG. 15 illustrates a prone pack pulled out from under a patient support frame.

With further reference to FIG. 14 and FIG. 15, the arm assembly 220 includes a release button 222, support arm carriage 224, rotation bracket 226, pin 228, support arm 230, prone slide rods 232 and frame bracket 234. The frame bracket 234 is mounted to the patient support frame. The support arm carriage 224 is pivotably and translatably mounted to the frame bracket 234 at the prone slide bar 236. The support arm carriage 224 may be coupled to the prone slide bar by a slide or linear bearing 238. The rotation bracket 226 may be rotatably coupled to the support arm carriage 224, or otherwise rotatably coupled to the prone slide bar 236 through attachment to the support arm carriage 224. The rotation bracket 226 is translatably coupled to the support arm 230 by one or more slide or linear bearings 238 and cooperating prone slide rods 232. The slide rods 232 are fixed at each end to the support arm 230, thus permitting the support arm 230 to translate with respect to the support arm carriage 224. Such translation permits the prone pack 40 to be moved from a stowed position under the patient support frame (FIG. 14) to partial deployment to the side of the patient support frame (FIG. 15). To translate the prone pack, a caregiver may press the release button 222 so that support arm 230 is released to translate with respect to the support arm carriage 224. The support arm assembly 220 can then be pulled out from under the patient support frame 12. Once the support arm assembly 220 is pulled fully from under the patient support frame it may reach its end of travel.

Figure 18:
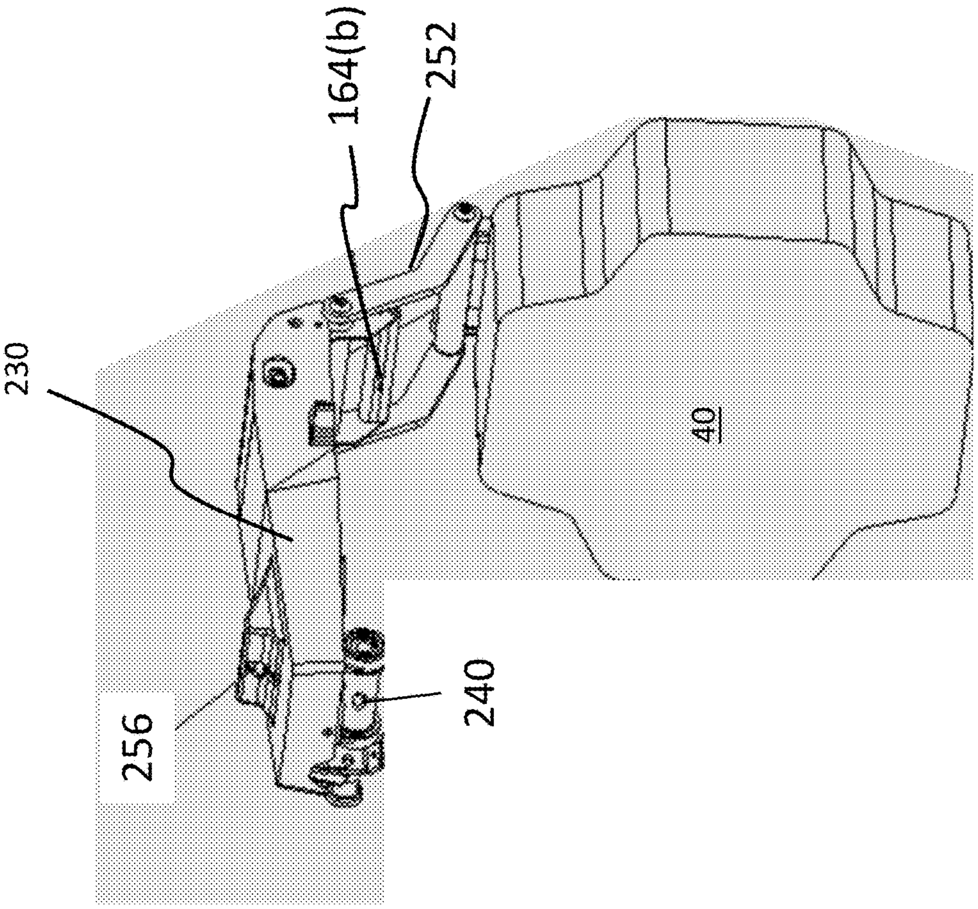

The rotation bracket 226 may be rotatably mounted to the support arm carriage 224. The rotation bracket 226 may be prevented from rotating with respect to the support arm carriage by a pin 228 cooperatively engaging a locking hole 240 (shown in FIG. 18, for example) while the prone pack is being pulled from under the patient support frame. Once the prone pack 40 is fully retracted, the pin 228 may engage a support pack fork 242, which rotationally unlocks the rotation bracket from the support arm carriage 224 by pulling the pin from the locking hole.

Figure 16:
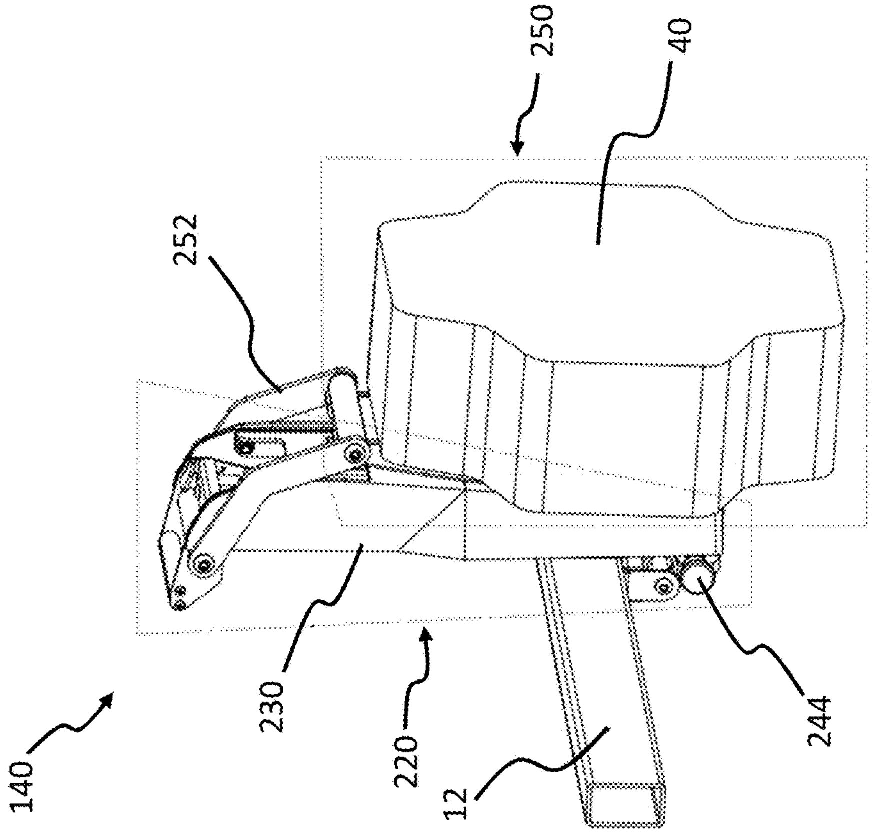
FIG. 16 illustrates a prone pack rotated to a vertical position for deployment.

The arm assembly 220 can then be rotated to a position approximately perpendicular or some other angle to the frame, or to a position placing the prone pack 40 approximately perpendicular or some other angle to the frame, at the side of the patient support frame (as shown in FIG. 16). Notably, the length of the support arm assembly 220 may help to define a pathway of travel for the support pack assembly. For example, the length of the arm assembly and shape and position of the pivot arms 252 may help to control the general path of travel as a support pack is moved.

Figure 19:
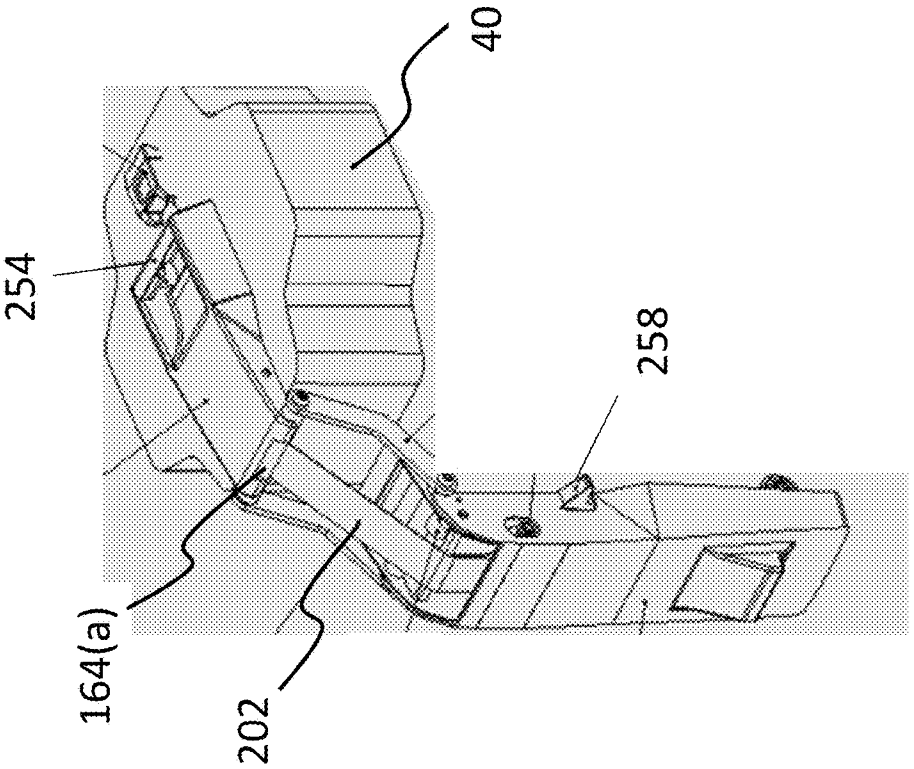
FIGS. 18, 19 and 20 illustrate further angles and details of one embodiment of a prone pack support assembly.

Once the arm assembly 220 (and likewise the support pack assembly 250) is rotated to a vertical position shown in FIG. 16, a support pack lock plunger 244, attached to the arm assembly, engages the arm carriage 224 to rotationally fix the arm carriage 224, thus preventing the arm assembly 220 from pivoting back down by gravity. The plunger 244 locks the support pack assembly 250 into an "in use" position. During the transition from the stowed position to the "in use" position, a prone pack rotation lock handle 254 (FIG. 19), may lock to the arm assembly via a prone pack rotation lock tab 256. This lock system holds the support pack assembly in place against the arm assembly. The prone pack rotation lock tab 256 can be disengaged by pulling a prone pack release lever 258, which pulls the prone pack rotation lock release bar 260 (FIG. 15) that disengages the prone pack rotation lock tab. This unlocks the support pack assembly from the arm assembly. The support pack assembly is free to rotate on the prone pack pivot arm to a patient support position.

Figure 20:
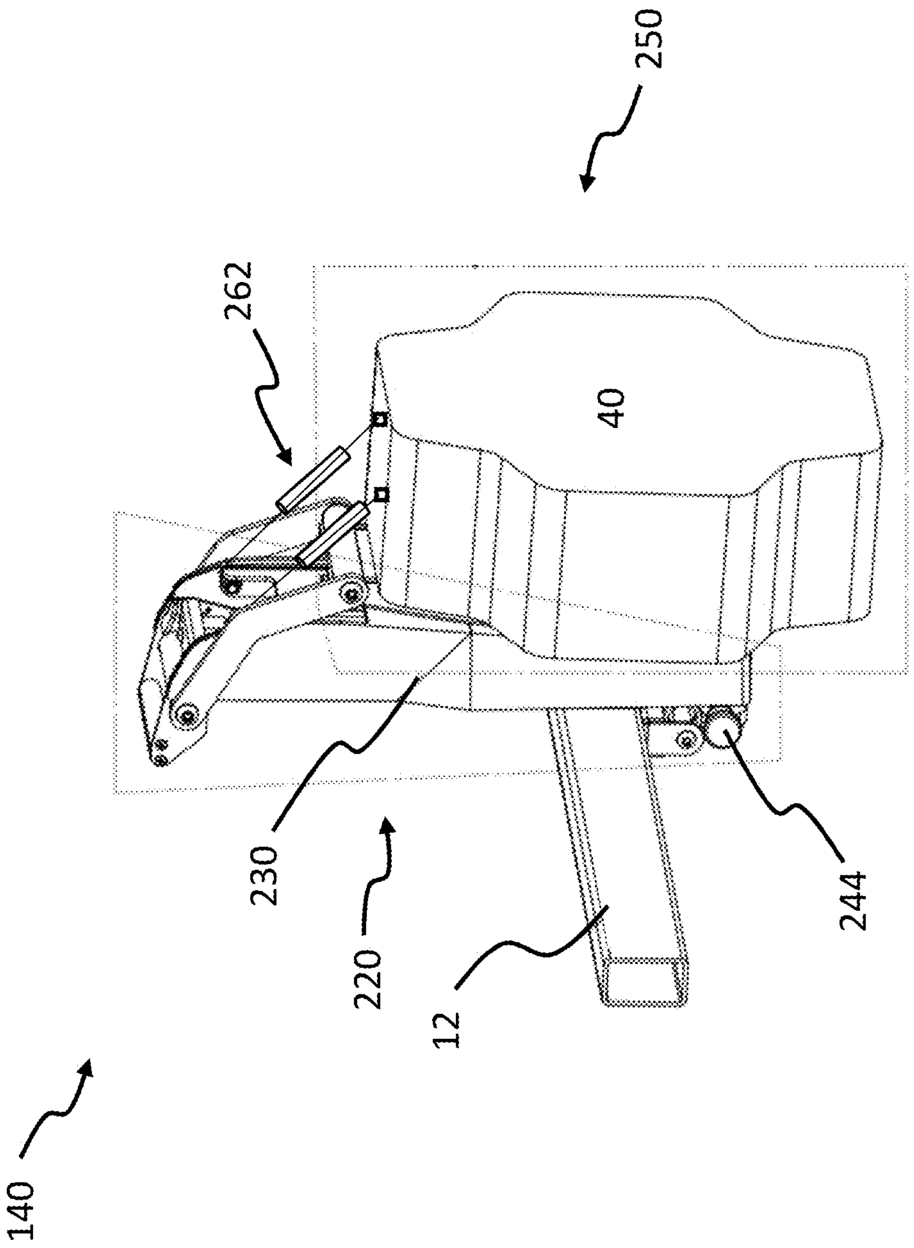

In some embodiments, as shown in FIG. 20, one or more springs 262 may be used to aid a caregiver when rotating the support pack assembly. The weight of the support pack assembly may be stabilized by the support arm assembly 250 and the one or more springs may urge the support pack assembly away from the arm assembly when rotating the prone pack to a deployed position.

Figure 17:
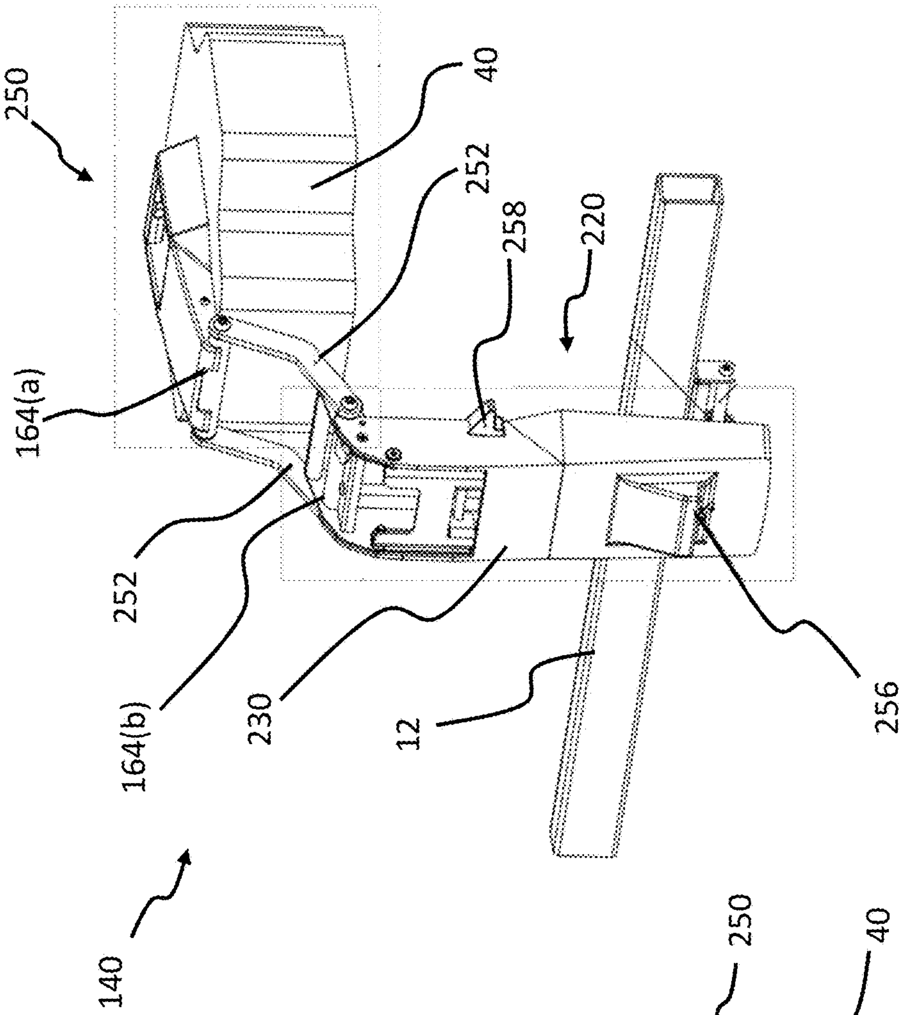
FIG. 17 illustrates a prone pack in a deployed position.

While the above discussion of components associated with movement of a support pack assembly is described in relation to moving a pack from a stowed to a deployed or working position, those operations may generally be reversed, so that a support pack assembly may be moved from a working position to a stowed position. For example, to move a support pack from a working position to a stowed position, a pack may be pivotably moved from the configuration shown in FIG. 17 to that shown in FIG. 16 via actuation of pivot arm (pivoting about the hinges 164(*a*) and 164(*b*). As may be understood in comparison of FIG. 16 and FIGS. 14, 15, the support arm assembly 140 may then be rotated (using rotation bracket 226) and translated using carriage 224. This pathway is unique in among related therapeutic beds in that it allows for rotational and translation movement along a pathway that avoids the side support and effectively allows both support components to be stowed without having to detach other support structure.

In some embodiments, the support arm assembly or support pack assembly could be moved from the stowed to "in use" position using a four bar or some other path generator mechanism. In some embodiments, a lockable gas spring or multiple gas springs could be used to selectively reduce the degrees of freedom of the independently hinged components of the articulatable arm assembly or support pack assembly. In some embodiments, a powered actuator or multiple powered actuators could be used to selectively reduce the degrees of freedom of the independently hinged components of the support arm assembly or support pack assembly.

In some embodiments, a therapeutic bed may be configured for rotating a patient, the therapeutic bed including a support system for safely limiting patient motion during rotation. The therapeutic bed may include a frame supported for rotation of a patient; a plurality of support packs configured for supporting the patient from falling forward in an anterior direction when the frame is rotated; and a pair of side supports configured for supporting the patient from moving laterally when the frame is rotated. Each of the plurality of support packs and the pair of side supports may be configured for adjustment between a support position and a stowed position. Each of the plurality of support packs and the pair of side supports may remain secured to the frame during the adjustment between the support position and the stowed position.

In some embodiments, a therapeutic bed may be configured for rotating a patient, the bed including a support system for safely limiting patient motion during rotation. The bed may include a frame supported for rotation of a patient; at least one support pack configured for supporting the patient so as to help secure the patient from falling forward in an anterior direction when said frame is rotated, and a support arm assembly. The at least one support pack being mounted on a support arm assembly. The support arm assembly may include a carriage; a rotation bracket rotationally mounted to said carriage; at least one slide rod slidably coupled to said rotation bracket through at least one linear bearing. The support arm assembly may be adjustably mounted to said frame and configured for movement along a path of travel so as to adjustably position said at least one support pack between a working and a stowed configuration.

It is an objective of some embodiments of therapeutic apparatuses herein to provide patient supports suitable for use when rotating a patient wherein the supports are fully stowable so as to be removed from a patient path of movement used during patient transfer to or from the apparatus. It is further an objective of some embodiments herein to provide patient supports that are stowable without requiring a caregiver to support a substantial proportion of the weight of the supports. For example, support padding may be at least partially supported during stowing so that a caregiver never has to bear the full weight of the support. It is further an objective of some embodiments herein to provide therapeutic apparatuses in which each of a side support and support packs are stowable without having to detach either or both of those supports from the therapeutic apparatus. For example, in some embodiments, a side support may be vertically adjusted so as to provide a range of vertical motions to the support so that it may clear a support frame when rotatably stowed. Such a design may use a combination of vertical adjustment and rotation when stowing a side support so as to help avoid presenting obstructions when fully stowing all supports in the apparatus.

Although the foregoing specific details describe various embodiments, persons of ordinary skill in the art will recognize that various changes may be made in the details of the disclosed subject matter without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that the disclosed subject matter is not to be limited to the specific details shown and described herein.

What is claimed is:

1. A therapeutic bed comprising:

a frame configured to rotate a patient;

a side support rotatably and translatably coupled to the frame, the side support being rotatable between a deployed position in which the side support restricts lateral movement of a patient when the patient disposed on a first side of the frame, and a stowed position in which the side support is positioned at a second side of the frame opposite the first side of the frame; and a prone pack rotatably and translatably coupled to the frame, the prone pack being rotatable between a deployed position in which the prone pack restrains the patient when the side support is in the deployed position, and a stowed position in which the prone pack is positioned at the second side of the frame so as to permit the side support to rotate to the stowed position.

2. The therapeutic bed of claim 1 further comprising:

a carriage translatably coupled to the frame; and a first adductor arm translatably coupled to the side support and rotatably coupled to the carriage.

3. The therapeutic bed of claim 2, further comprising a gas spring mounted to the frame and to the carriage, the gas spring being configured to lock the carriage against translation with respect to the frame.

4. The therapeutic bed of claim 3, the first adductor arm being lockable against rotation with respect to the carriage.

5. The therapeutic bed of claim 4, further comprising a pull pin disposed so as to lock the first adductor arm against rotation with respect to the carriage.

6. The therapeutic bed of claim 2, further comprising a slide rod and cooperative slide bearing translatably coupling the carriage to the frame.

7. The therapeutic bed of claim 6, the slide rod having a first end being mounted at or near an edge of the frame and a second end being mounted within the frame, the slide bearing being coupled to the carriage and slidably engaging the slide rod.

8. The therapeutic bed of claim 7, further comprising a second adductor arm rotatably coupled to the frame and translatably coupled to the side support.

9. The therapeutic bed of claim 8, further comprising:
a first slide rod and cooperative first slide bearing translatably coupling the first adductor arm to the side support; and
a second slide rod and cooperative second slide bearing translatably coupling the second adductor arm to the side support.

10. The therapeutic bed of claim 8, the carriage being disposed at approximately the midpoint between a head end and a foot end of the frame, and the second adductor arm being rotatably coupled to the frame at the foot end of the frame.

11. The therapeutic bed of claim 10, further comprising:
an arm assembly rotatably and translatably coupled to the frame; and
a support pack assembly rotatably coupled to the arm assembly, the prone pack being mounted to the support pack assembly.

12. The therapeutic bed of claim 11, further comprising:
a first slide bar and cooperative second slide bearing translatably coupling the arm assembly to the frame for translation of the prone pack between a head end and a foot end of the frame; and
a second slide bar and cooperative second slide bearing translatably coupling the arm assembly to the frame for translation of the prone pack from the stowed position to a translated intermediate position at least partially outside an edge of the frame.

13. The therapeutic bed of claim 12, the arm assembly being locked from rotating with respect to the frame until the prone pack is fully translated to the translated intermediate position.

14. The therapeutic bed of claim 13, comprising:
a pin disposed so as to lock the arm assembly from rotation with respect to the frame until the prone pack is fully translated to the translated position; and
a fork disposed so as to engage the pin when the prone pack is at the translated position and thereby unlock the arm assembly from rotation with respect to the frame.

15. The therapeutic bed of claim 14, further comprising a pull pin disposed so as to lock the arm assembly from rotation with respect to the frame when the arm assembly has been rotated to position the prone pack approximately perpendicular to the frame.

16. The therapeutic bed of claim 15, further comprising a pivot arm rotatably coupling the support pack assembly to the arm assembly.

17. The therapeutic bed of claim 16, the support pack assembly releasably engaging the arm assembly.

18. The therapeutic bed of claim 17, the support pack assembly being pivotable with respect to the arm assembly from an engaged position along the arm assembly to a deployed position over the patient.

* * * * *